(12) United States Patent
Zhang et al.

(10) Patent No.: US 8,598,480 B2
(45) Date of Patent: Dec. 3, 2013

(54) ELECTRONIC DEVICE WITH SWITCHES TO SELECTIVELY CONTROL SAFE ACCESS

(75) Inventors: Jun-Xiong Zhang, Shenzhen (CN); Zhi-Xin Li, Shenzhen (CN); Bang-Wei Wang, Shenzhen (CN); You-Tao Wang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 188 days.

(21) Appl. No.: 13/207,452

(22) Filed: Aug. 11, 2011

(65) Prior Publication Data

US 2012/0222942 A1     Sep. 6, 2012

(30) Foreign Application Priority Data

Mar. 2, 2011   (CN) .......................... 2011 1 0050182

(51) Int. Cl.
*H01H 9/22*           (2006.01)
(52) U.S. Cl.
USPC .............................. 200/336; 200/334; 200/341
(58) Field of Classification Search
USPC ................................................ 200/572, 550
See application file for complete search history.

(56) References Cited

U.S. PATENT DOCUMENTS

| | | | | |
|---|---|---|---|---|
| 5,493,084 | A * | 2/1996 | Whitaker et al. | 200/50.05 |
| 5,657,861 | A * | 8/1997 | Takano et al. | 200/550 |
| 5,818,015 | A * | 10/1998 | Lee et al. | 219/723 |
| 6,812,416 | B2 * | 11/2004 | Tasse | 200/50.01 |
| 7,071,427 | B2 * | 7/2006 | Houck et al. | 200/50.05 |
| 7,420,133 | B2 * | 9/2008 | Farrow et al. | 200/50.15 |
| 8,254,089 | B2 * | 8/2012 | Cosley et al. | 361/640 |
| 8,334,469 | B2 * | 12/2012 | Takenaka | 200/50.02 |
| 2012/0160646 | A1* | 6/2012 | Zhang et al. | 200/336 |
| 2012/0186960 | A1* | 7/2012 | Zhang et al. | 200/5 A |

* cited by examiner

*Primary Examiner* — Renee Luebke
*Assistant Examiner* — Ahmed Saeed
(74) *Attorney, Agent, or Firm* — Altis & Wispro Law Group, Inc.

(57) ABSTRACT

An exemplary electronic device includes a casing, a first switch, a second switch and a switch control unit. The casing includes a side plate and a top plate detachably connected with a top end of the side plate. The first switch is turned on when the top plate is connected to the side plate and turned off when the top plate is detached from the side plate. The switch control unit includes a sliding member mounted at one side of the second switch. The sliding member includes a pressing plate. The sliding member is moveable relative to the side plate between a first state in which the pressing plate aligned with and pressing the second switch to turn on the second switch and a second state in which the pressing plate is staggered with the second switch to turn off the second switch.

20 Claims, 8 Drawing Sheets

ELECTRONIC DEVICE WITH SWITCHES TO SELECTIVELY CONTROL SAFE ACCESS

BACKGROUND

1. Technical Field

The disclosure relates to electronic devices, and particularly to an electronic device with a switch control unit for controlling an automatic power-off function thereof.

2. Description of the Related Art

To protect the personal safety of users, computer server systems are required to automatically power-off when a user begins to physically open the computer server system. A conventional computer server system often includes multiple standard servers mounted in a server cabinet, and a side door mounted on one side of the server cabinet. When the side door of the computer server system is opened by a user, the computer server system automatically powers off, thereby protecting the user's personal safety.

However, some professional staff require the computer server system to remain on when such staff access the computer server system. For example, certain maintenance operations must be carried out while the computer server system is powered on. When the side door of the computer server system is opened for maintenance operations by professional staff, and the computer server system automatically powers off, this inconveniences the professional staff. In addition, the work efficiency of the professional staff is reduced.

What is desired, therefore, is an electronic device which can overcome the above-described shortcomings.

DETAILED DESCRIPTION

Figure 1:
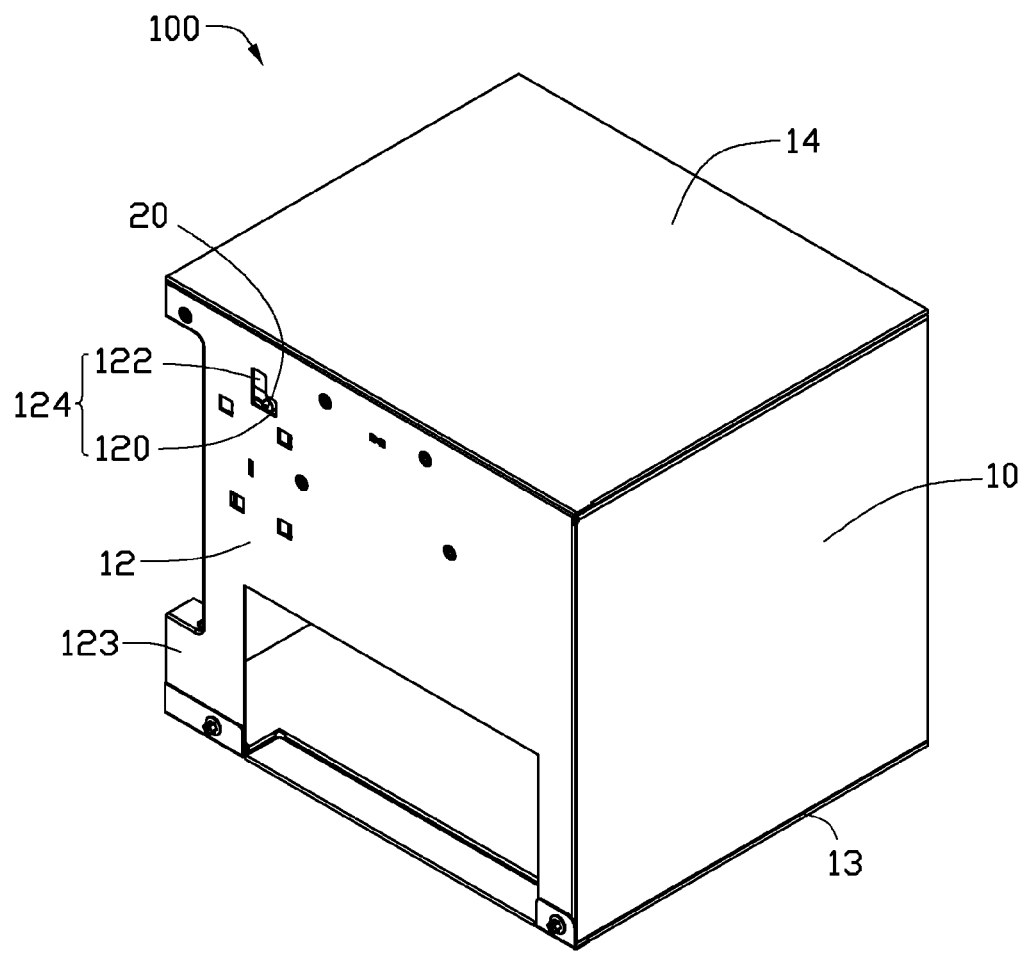
FIG. 1 is a schematic, isometric, assembled view of an electronic device in accordance with an exemplary embodiment.

Reference will now be made to the drawing figures to describe the present electronic device in detail.

Figure 2:
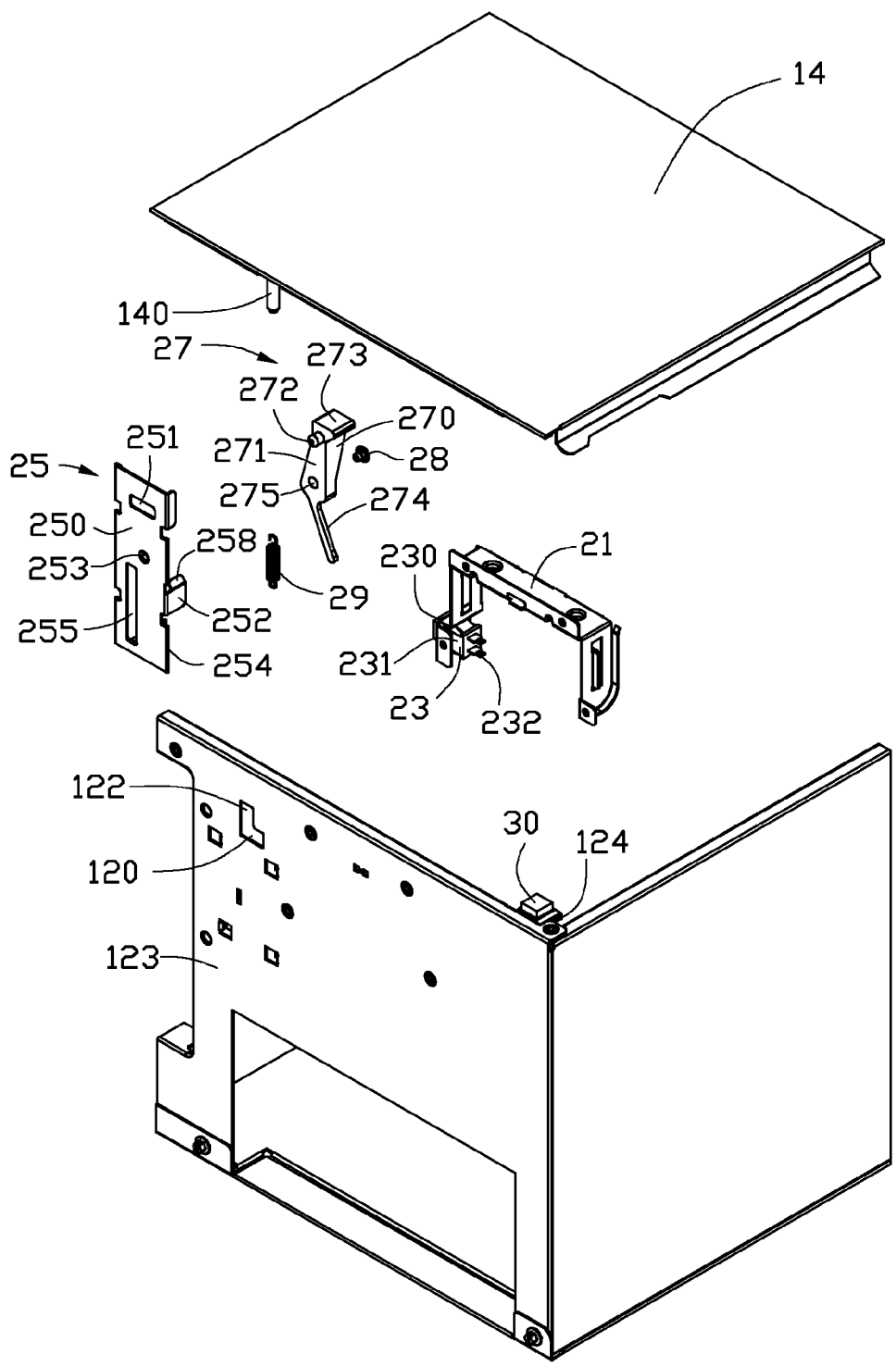
FIG. 2 is an exploded view of the electronic device of FIG. 1.

Referring to FIGS. 1 and 2, an electronic device 100 in accordance with an exemplary embodiment includes a casing 10, and a first switch 30, a second switch 23 and a switch control unit 20 received in the casing 10.

The casing 10 is hollow and rectangular, and includes a bottom plate 13, a top plate 14 spaced from the bottom plate 13, and a plurality of side plates 12 connected between the top plate 14 and the bottom plate 13. One of the side plates 12, i.e., a front plate 123, defines therein a locating hole 124 at a position which is adjacent to the top plate 14. The locating hole 124 is L-shaped overall, and includes a horizontally oriented first hole 120 and a vertically oriented second hole 122 perpendicular to the first hole 120. A bottom end of the second hole 122 communicates with a left end of the first hole 120.

Figure 3:
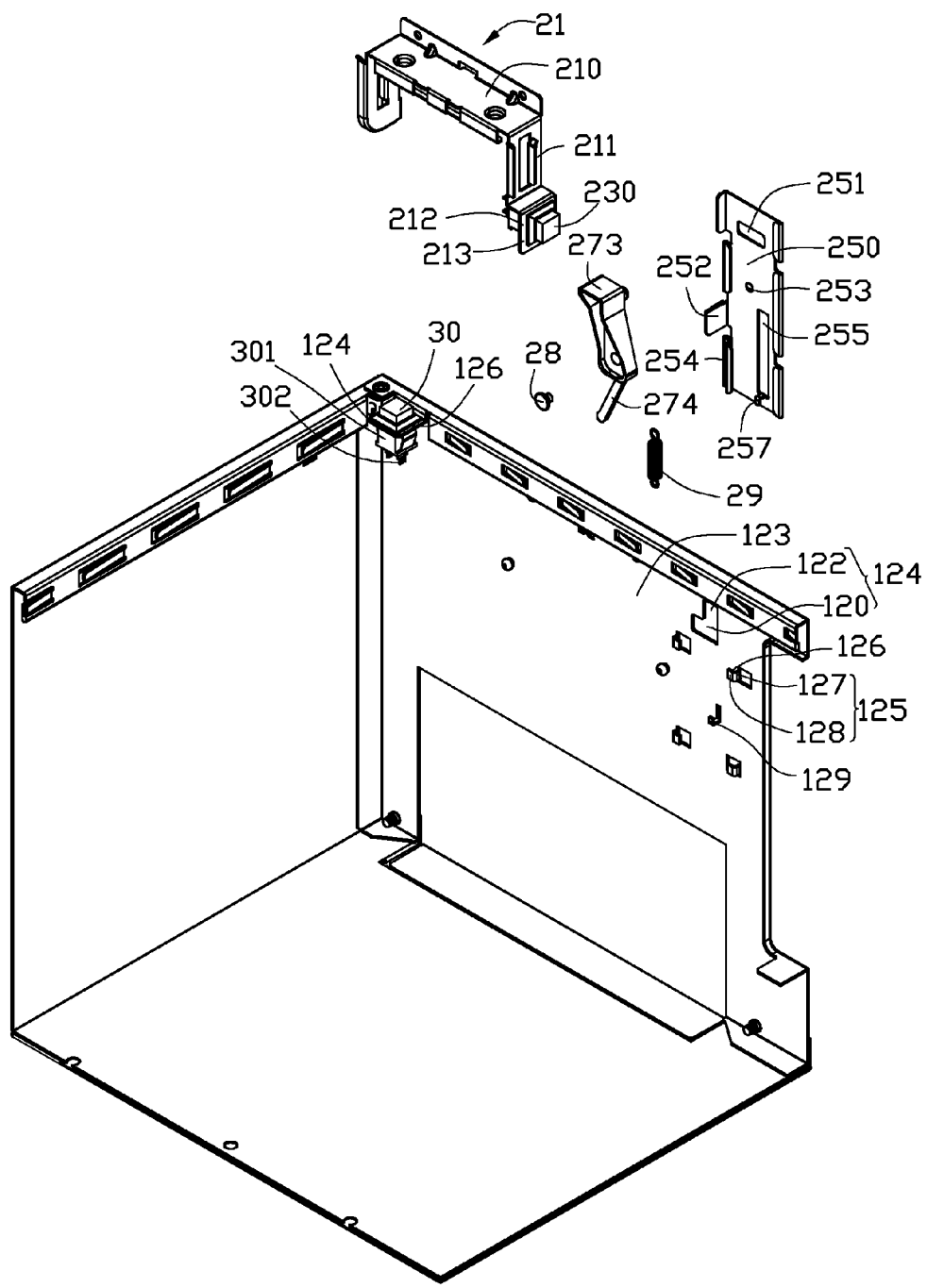
FIG. 3 is an exploded view of the electronic device of FIG. 1, but shown from a different aspect and with a top plate omitted.

Referring also to FIG. 3, the front plate 123 includes a fixing plate 124 extending perpendicularly and inwardly towards an interior of the casing 10 from a top periphery side thereof. The fixing plate 124 is rectangular, and defines a rectangular fixing hole 126 at a central portion thereof. A first switch 30 is mounted in the fixing hole 126 of the fixing plate 124. The first switch 30 includes a first main body 301 vertically received in the fixing hole 126, and two first contact legs 302 extending downward from a bottom side of the first main body 301. The first main body 301 of the first switch 30 is axially moveable in the fixing hole 126. Thereby, the first contacting legs 302 can be moved downwardly to a first state in which the first contacting legs 302 are electrically connected to a power circuit of the electronic device 100 such that the electronic device 100 is powered on, and can be moved upwardly to a second state in which the first contacting legs 302 are disconnected from the power circuit of the electronic device 100 such that the electronic device 100 is powered off. When the first contacting legs 302 are at the first state, the first switch 30 is turned on. When the first contacting legs 302 are at the second state, the first switch 30 is turned off.

The front plate 123 includes two pairs of guiding members 125 located at two opposite sides of the locating hole 124, respectively. Each of the guiding members 125 includes a connecting wall 127 extending perpendicularly and inwardly from the front plate 123, and a locating wall 128 extending perpendicularly from a distal end of the connecting wall 127 towards a neighboring guiding member 125. A groove 126 is enclosed by the connecting wall 127 and the locating wall 128 of each of the guiding members 125. A first hook 129 is located between the two pairs of guiding members 125.

The top plate 14 includes a locating pole 140 extending perpendicularly and downward from a position thereof adjacent to the front plate 123. A bottom side of the locating pole 140 is aligned with a top side of the first main body 301 of the first switch 30.

The switch control unit 20 includes a fixing frame 21, a sliding member 25 located at one side of the fixing frame 21, an operating member 27 connected with the sliding member 25, and an elastic member 29 connected between the operating member 27 and the front plate 123. The switch control unit 20 and the first switch 30 are located at two opposite sides of the front plate 123.

The fixing frame 21 includes an elongated mounting plate 210, two fixing legs 211 extending perpendicularly and downwardly from two opposite ends of the mounting plate 210, and an engaging plate 212 extending outward from one of the fixing legs 211. The fixing frame 21 is mounted to the front plate 21 via a plurality of fasteners (not shown) traversing through the mounting plate 210 and further screwed into the front plate 123, with the engaging plate 212 located at a left side of the guiding members 125 and aimed at a middle position of each pair of guiding members 125. The engaging plate 212 is parallel to the connecting walls 127 of the guiding members 125. The engaging plate 212 defines an engaging hole 213 at a central portion thereof.

The sliding member 25 is mounted on a position of the front plate 123 that is between the two pairs of guiding members 125. The sliding member 25 includes a main plate 250, two flanges 254 extending perpendicularly from two opposite sides of the main plate 250, and a pressing plate 252 extending perpendicularly from a middle portion of one of the flanges 254. The sliding member 25 is mounted between the two pairs of guiding members 125, with the two flanges 254 of the main plate 250 engaged in the grooves 126 of the guiding members 125, and the sliding member 25 is axially slidable in the grooves 126 along an arrangement direction of each pair of guiding members 125. The main plate 250 defines an elongated guiding channel 251 at a top end thereof. The sliding member 25 can slide upward to a first position with the guiding channel 251 aligned with the first hole 120 of the front plate 123, and downward to a second position with the guiding channel 251 aligned with the second hole 122 of the front plate 123.

The main plate 250 defines a circular mounting hole 253 at a central portion thereof and a rectangular opening 255 at a side portion thereof. The opening 255 is located under the mounting hole 253. A second hook 257 extends inwardly from one peripheral side of the opening 255 which is far away from the mounting hole 253 towards the interior of the casing 10. The second hook 257 is L-shaped overall. When the sliding member 25 is mounted to the front plate 123, the first hook 129 of the front plate 123 traverses through the opening 255 of the sliding member 25 and protrudes into the interior of the casing 10 to align with the second hook 257. The pressing plate 252 includes an inclined hem 258 extending slantwise and upward from a top side thereof.

The operating member 27 includes a main rod 271, an operating handle 272 extending from one end of the main rod 271, and an elastic arm 274 extending slantwise and downward from another end of the main rod 271. The main rod 271 defines a pivot hole 275 at the other end, the pivot hole 275 being adjacent to the elastic arm 274. The operating member 27 and the sliding member 25 are connected to each other via a pivot axis 28 received in the pivot hole 275 of the main rod 271 and fixed in the mounting hole 253 of the sliding member 25, such that the main rod 271 of the operating member 27 is rotatable around the pivot axis 28 relative to the sliding member 25. The operating handle 27 is substantially cylindrical, and extends perpendicularly from a top end of the main rod 271. When the sliding member 25 together with the operating member 27 are mounted to the front plate 123, the operating handle 27 traverses through the guiding channel 251 of the sliding member 25 and the locating hole 124 of the front plate 123 in sequence and protrudes out to an exterior of the casing 10.

The elastic arm 274 extends slantwise and downward from a bottom end of the main rod 271, with a bottom side of the elastic arm 274 abutting against one of the flanges 254 of the sliding member 25. An angle is defined between the main rod 271 and the elastic arm 274. When the operating handle 272 is urged to slide from a left end of the guiding channel 251 to a right end thereof, the main rod 271 rotates around the pivot axis 28 relative to the sliding member 25, to thereby force the bottom side of the elastic arm 274 to slide downward along the corresponding flange 254 of the sliding member 25. Therefore, the angle defined between the main rod 271 and the elastic arm 274 is increased.

The elastic member 29 has one end connected to the first hook 129 of the front plate 123, and another end connected to the second hook 257 of the sliding member 25. When the sliding member 25 is at the first position, the elastic member 29 is stretched; and when the sliding member 25 is at the second position, the elastic member 29 is compressed.

The second switch 23 includes a second main body 231 engagingly received in the engaging hole 213 of the engaging plate 212, and two second contact legs 232 extending horizontally from one end of the second main body 231. The second main body 231 of the second switch 23 has a contact end 230 far away from the second contact legs 232. The second switch 23 is horizontally moveable between a first state in which the second contact legs 232 are electrically connected to the power circuit of the electronic device 100 such that the electronic device 100 is powered on, and a second state in which the second contact legs 232 are disconnected from the power circuit of the electronic device 100 such that the electronic device 100 is powered off. The second switch 23 and the first switch 30 are electrically connected in parallel.

When the sliding member 25 is moved upward to the first position, the pressing plate 252 of the sliding member 25 is aligned with the contact end 230 of the second main body 231 of the second switch 23, such that a pressing force can be applied to the contact end 230 of the second switch 23 to push the second switch 23 horizontally to the first state. When the sliding member 25 is moved downward to the second position, the pressing plate 252 of the sliding member 25 is below the contact end 230 of the second switch 23, such that the pressing force applied on the contact end 230 of the second switch 23 is withdrawn and the second switch 23 is at the second state.

Figure 4:
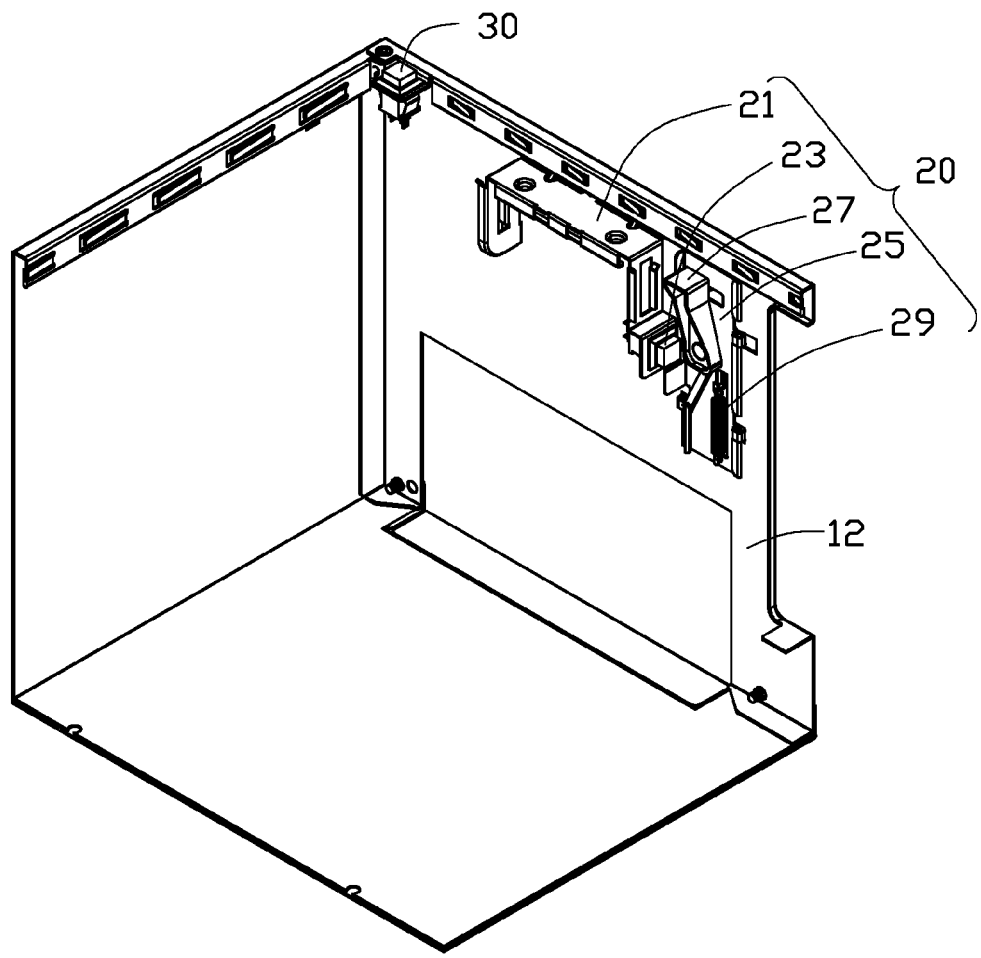
FIG. 4 is an assembled view of the electronic device shown in FIG. 3.
Figure 5:
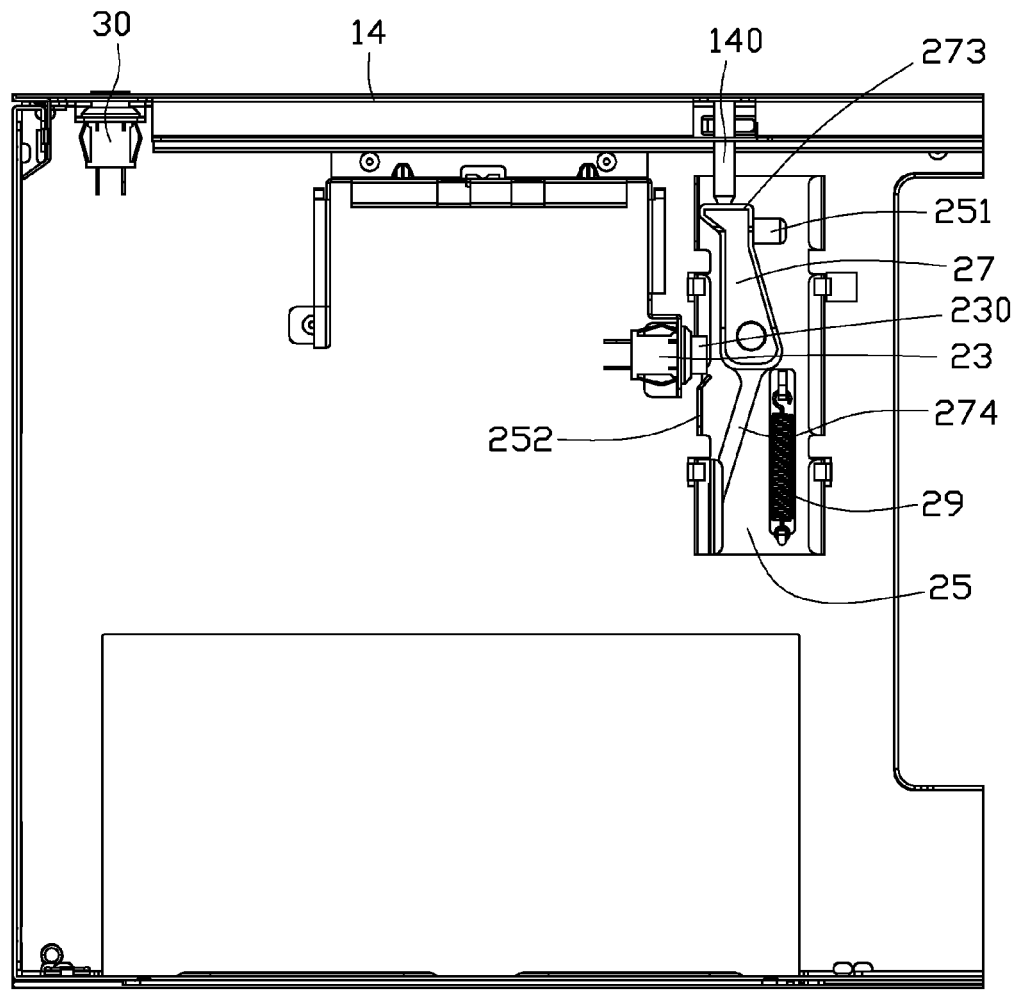
FIG. 5 is a plan view of an inner side of the electronic device seen in FIG. 4, showing a switch control unit in an opened position.

Referring also to FIGS. 4 and 5, when assembled, the switch control unit 20 is mounted on the front plate 123, and the top plate 14 covers a top end of the side plates 12, with the locating pole 140 abutting against the top end of the operating member 27. Thus, a downward pressing force is applied to the top end of the first main body 301 of the first switch 30 to force the first switch 30 to move downward to the second state. The first switch 30 is thus turned on. Simultaneously, the sliding member 25 together with the operating member 27 movs downward to the second position under pressure of the locating pole 140 of the top plate 14. Therefore, the pressing plate 252 of the sliding member 25 is located below the contact end 230 of the second main body 231 of the second switch 23, and the second switch 23 is turned off. In this state, the operating handle 272 is located in the first hole 120 of the front plate 123, and is received in the left end of the guiding channel 251 of the sliding member 25. In this state, a distance between the first hook 129 and the second hook 257 is maximal, and the elastic member 29 is stretched.

Figure 6:
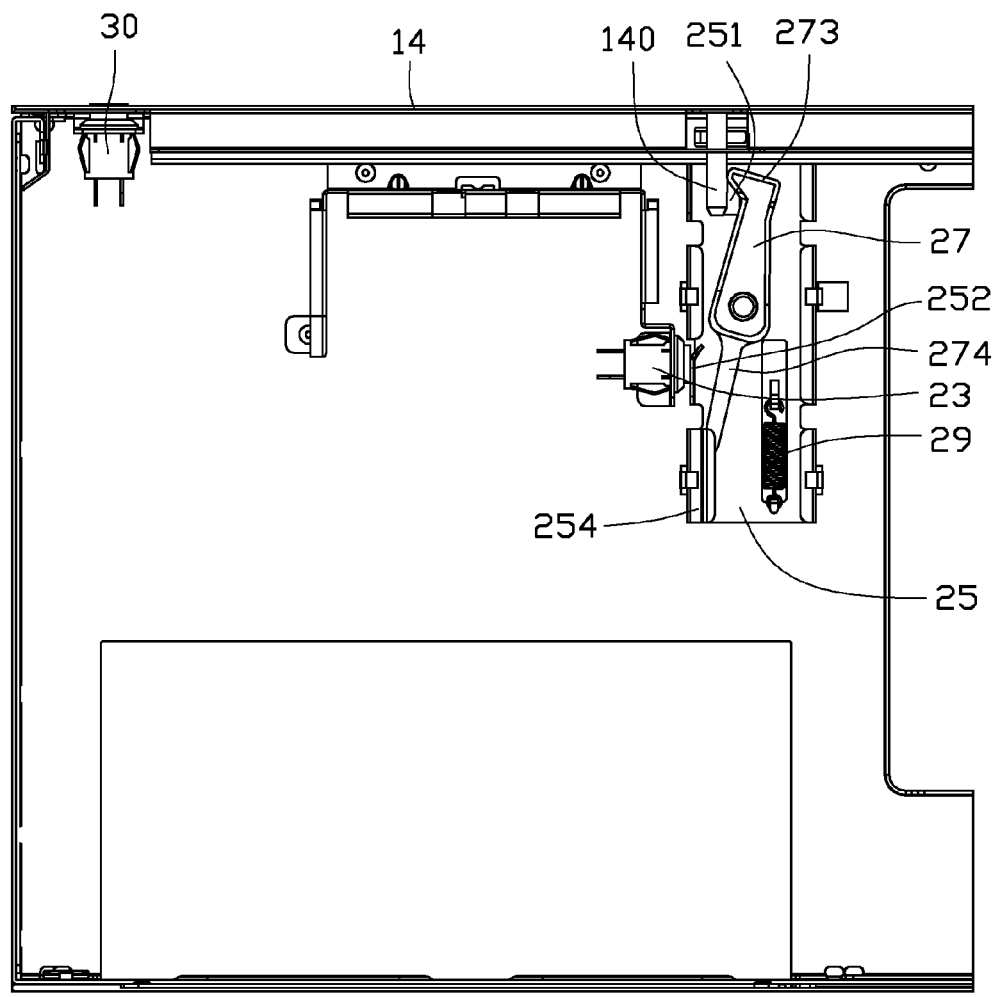
FIG. 6 is similar to FIG. 5, but showing the switch control unit in a connection position.

Referring also to FIG. 6, when the operating handle 272 is urged to move from the first hole 120 to the second hole 122, the operating handle 272 slides from the left end of the guiding channel 251 of the sliding member 25 to the right end, and the main rod 270 of the operating handle 272 rotates around the pivot axis 28. Thus, the top end of the operating member 27 departs from the locating pole 140 to locate at one side of the locating pole 140. A holding force is applied to the top end of the main rod 270 to maintain the operating handle 272 in position abutting against a right side of the second hole 122. Therefore, the pressing force applied on the top end of the operating member 27 is withdrawn, and the operating member 27 with the sliding member 25 together is moved upward to the first position by elastic restitution of the elastic member 29. Simultaneously, the pressing plate 252 of the sliding member 25 moves upward to align with the contact end 230 of the second main body 231 of the second switch 23. Thus, the second switch 23 is turned on. In this state, the bottom side of the elastic arm 274 abuts against the corresponding flange 254 of the sliding member 25, and the top end of the operating member 27 tightly abuts one side of the fixing pole 140. An angle formed between the main rod 271 and the elastic arm 274 when the second switch 23 is turned on is larger than the angle formed between the main rod 271 and the elastic arm 274 when the second switch 23 is turned off.

Figure 7:
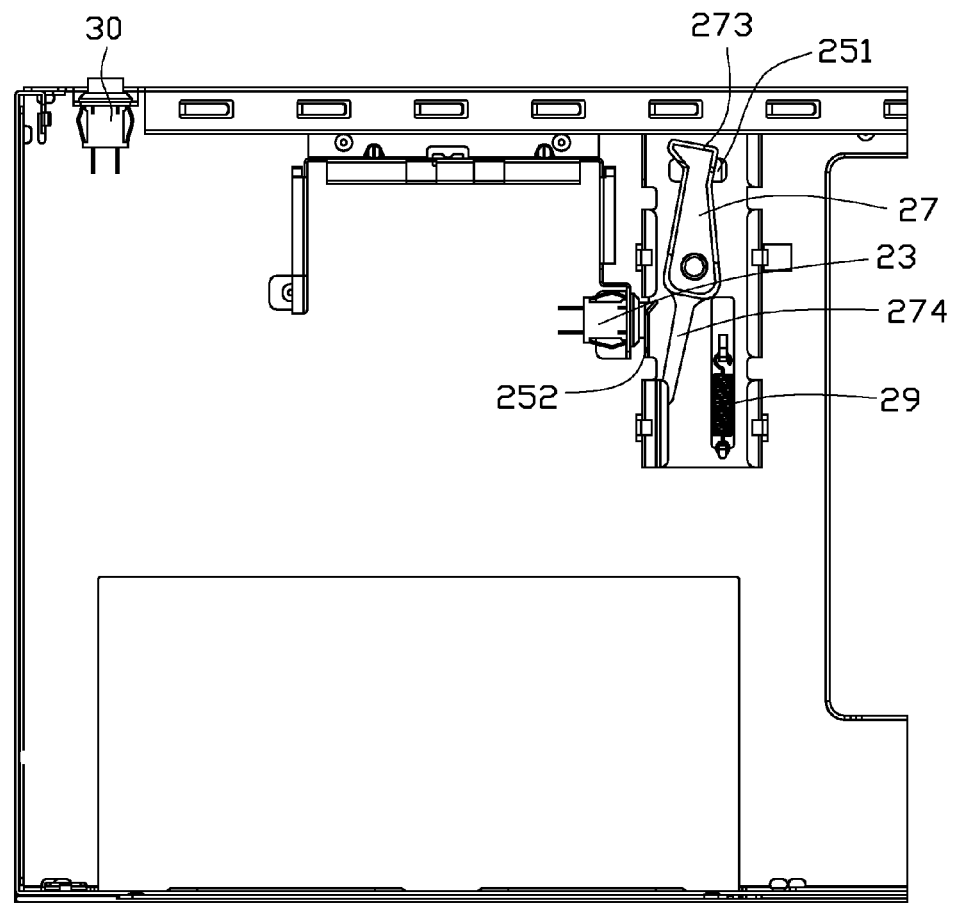
FIG. 7 is similar to FIG. 6, but with the top plate removed.

Referring to FIG. 7, when the top plate 14 of the electronic device 100 is detached from the casing 10, the fixing pole 140 is removed from the casing 10 together with the top plate 14. Thus, the downward pressing force applied to the top end of the first switch 30 by the top plate 14 is withdrawn, the first switch 30 moves upward to the first state, and the first switch 30 is turned off. In another aspect, the holding force applied to the top end of the operating member 27 by the locating pole 140 is withdrawn, and the main rod 271 of the operating member 27 rotates reversely until the operating handle 271 abuts a left side of the second hole 122. In this state, the pressing plate 252 remains in position abutting against the contact end 230 of the second main body 231 of the second switch 23, to thereby maintain the second switch 23 turned on. Due to the first switch 30 and the second switch 23 being connected in parallel, the electronic device 100 remains powered on.

Figure 8:
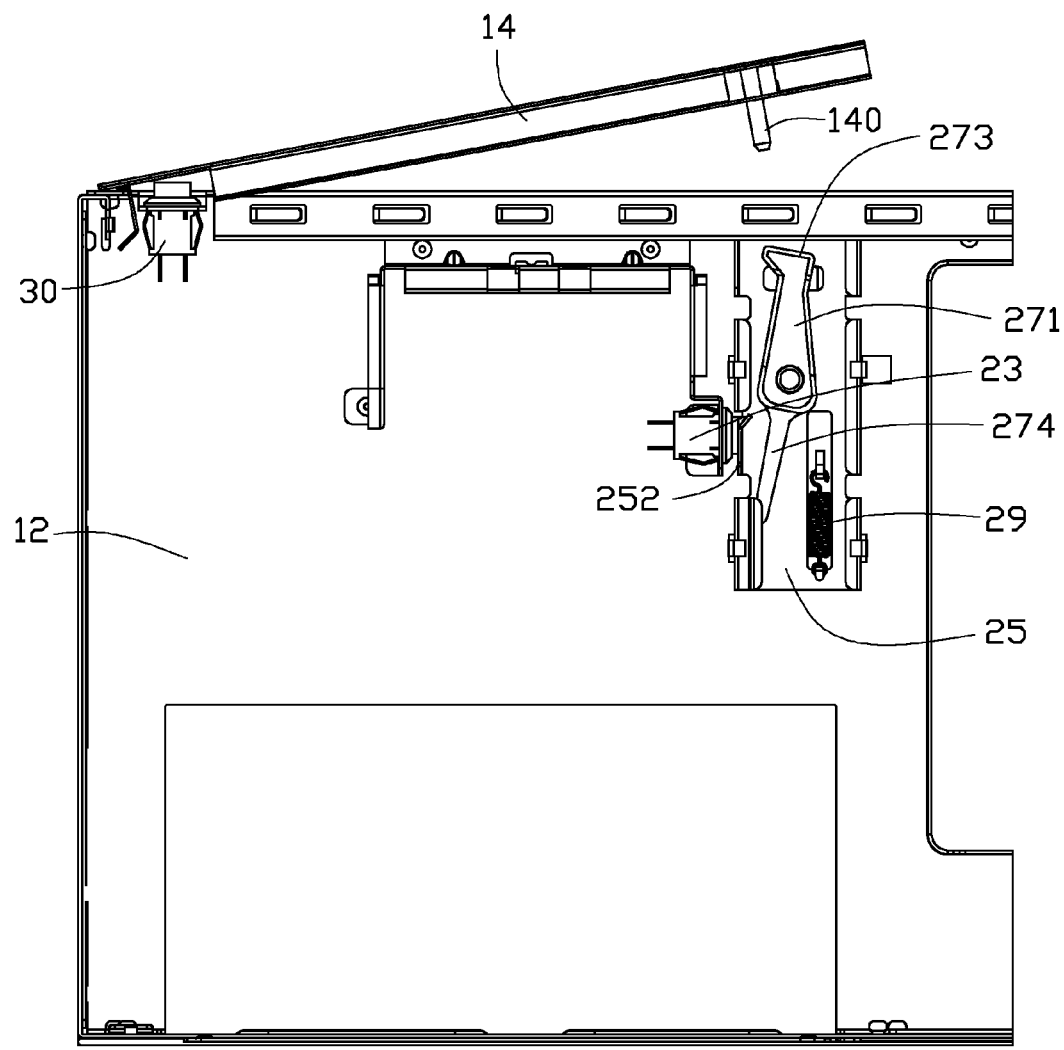
FIG. 8 is similar to FIG. 7, but showing the top plate being installed back onto the electronic device.

Referring also to FIG. 8, when the top plate 14 of the electronic device 100 is mounted to the top ends of the side plates 12 by rotating the top plate 14 around a peripheral side of the casing 10 which is adjacent to the first switch 30, downward pressing force is applied to the first switch 30 by the top plate 14 of the electronic device 100 such that the first switch 30 is turned on. When the top plate 14 fully covers the side plates 12, and the locating pole 140 of the top plate 14 pushes the top end of the operating member 27 to force the operating handle 271 to move downward along the second hole 122 of the locating hole 12. The sliding member 25 moves downward along the guiding members 125 together with the operating handle 271. The pressing plate 252 of the sliding member 25 moves downward to below the contact end 230 of the second switch 23, and the second switch 23 is turned off. Due to the first switch 30 and the second switch 23 being connected in parallel, the electronic device 100 is powered on.

During use of the electronic device 100, the top plate 14 fully covers the top ends of the side plates 12, and the first switch 30 remains turned on. The operating handle 271 of the operating member 27 remains received in the first hole 120, and the second switch 23 remains turned off. That is, when the top plate 14 fully covers the top ends of the side plates 12, the electronic device 100 remains powered on. When the top plate 14 of the electronic device 100 is opened by a user, the first switch 30 is turned off due to the absence of pressure of the top plate 14, as described above. Thus when the top plate 14 is opened, the electronic device 100 is automatically powered off to protect the user's personal safety.

However, when the operating handle 272 of the operating member 27 is urged to be received in the second hole 122 of the front plate 123 before the top plate 14 is opened, and then when the top plate 14 is opened by a user, the first switch 30 is turned off without the pressure of the top plate 14 as described above, but the second switch 23 remains turned on under the pressure of the pressing plate 252 of the sliding member 25. Thus, the electronic device 100 can remain powered on when the top plate 14 is opened, under control of the switch control unit 20. Accordingly, the electronic device 100 can realize its automatic power-off function according to different requirements of users.

It is to be further understood that even though numerous characteristics and advantages have been set forth in the foregoing description of embodiments, together with details of the structures and functions of the embodiments, the disclosure is illustrative only; and that changes may be made in detail, especially in matters of shape, size, and arrangement of parts within the principles of the disclosure to the full extent indicated by the broad general meaning of the terms in which the appended claims are expressed.

What is claimed is:

1. An electronic device, comprising:
   a casing comprising a side plate, and a top plate detachably connected with a top end of the side plate;
   a first switch mounted on the side plate, the first switch being turned on when the top plate is connected to the side plate and being turned off when the top plate is detached from the side plate;
   a second switch mounted on the side plate; and
   a switch control unit comprising a sliding member mounted at one side of the second switch, the sliding member comprising a pressing plate, the sliding member being moveable relative to the side plate between a first state in which the pressing plate is aligned with and presses the second switch to turn on the second switch, and a second state in which the pressing plate is offset from the second switch to turn off the second switch.

2. The electronic device as described in claim 1, wherein the switch control unit further comprises an operating member, the operating member comprising a main rod pivotally connected with the sliding member and an operating handle extending outward from the main rod, the sliding member defining an elongated guiding channel therein, the operating member connected with the sliding member with operating handle received in the guiding channel.

3. The electronic device as described in claim 2, wherein the side plate defines a locating hole therein, the operating member with the sliding member together mounted to the side plate with the operating handle extending through the guiding channel and the locating hole in a sequence to protrude out of the casing.

4. The electronic device as described in claim 3, wherein the locating hole comprises a first hole and a second hole communicated with the first hole, when the operating handle is located in the first hole, the second switch is turned off, and when the operating handle is located in the second hole, the second switch is turned on.

5. The electronic device as described in claim 4, wherein the top plate comprises a locating pole extending downward therefrom, when the operating handle is located in the first hole, the locating pole of the top plate abutting against a top of the operating member such that a downward pressing force is applied to the operating member for remaining the second switch being turned off.

6. The electronic device as described in claim 2, wherein the operating member further comprises an elastic arm extending slantwise from the main rod, an angle formed between the main rod and the elastic arm when the second switch is turned on being larger an angle formed between the main rod and the elastic arm when the second switch is turned off.

7. The electronic device as described in claim 1, wherein the side plate comprises a plurality of guiding members each defining a groove therein, the sliding member mounted on the side plate with two opposite sides thereof engaged in the grooves of the guiding members, the sliding member being moveable relative to the side plate along the guiding members.

8. The electronic device as described in claim 7, wherein the slide plate comprises a first hook between the guiding members, the sliding member defining an opening therein and comprising a second hook extending from a periphery side of the opening, the sliding member mounted to the side plate with the first hook extended through the opening and aligned with the second hook, an elastic member being connected between the first hook and the second hook.

9. The electronic device as described in claim 8, wherein a distance between the first hook and the second hook is gradually increased when sliding member moves from the first state to the second state.

10. The electronic device as described in claim 1, wherein the first switch is vertically moveable between the turned on state and the turned off state.

11. The electronic device as described in claim 10, wherein the second switch is horizontally moveable when the sliding member being moveable relative to the side plate between the first state and the second state.

12. An electronic device, comprising:
a casing comprising a side plate, and a top plate detachably connected with a top end of the side plate;
a first switch mounted on the side plate, the first switch being turned on when the top plate is connected to the side plate and turned off when the top plate is detached from the side plate;
a second switch being connected in parallel with the first switch and mounted on the side plate, the second switch comprising a contact end at one side thereof; and
a switch control unit comprising a sliding member mounted on the side plate and adjacent to the contact end of the second switch, the sliding member comprising a pressing plate, the sliding member being moveable relative to the side plate between a first state in which the pressing plate is aligned with and presses the contact end of the second switch such that the second switch is turned on, and a second state in which the pressing plate offset from the second switch such that the second switch is turned off.

13. The electronic device as described in claim 12, wherein the switch control unit further comprises an operating member, the operating member comprising a main rod pivotally connected with the sliding member and an operating handle extending outward from the main rod, the sliding member defining an elongated guiding channel therein, the side plate defining the locating hole communicated with the guiding channel of the sliding member, the operating member with the sliding member together mounted to the side plate with the operating handle extending through the guiding channel and the locating hole in a sequence to protrude out of the casing.

14. The electronic device as described in claim 13, wherein the locating hole comprises a first hole and a second hole communicated with the first hole, when the operating handle is located in the first hole, the second switch is turned off, and when the operating handle is located in the second hole, the second switch is turned on.

15. The electronic device as described in claim 14, wherein the top plate comprises a locating pole extending downward therefrom, when the operating handle is located in the first hole, the locating pole of the top plate abutting against a top of the operating member such that a downward pressing force is applied to the operating member for remaining the second switch being turned off.

16. The electronic device as described in claim 13, wherein the operating member further comprises an elastic arm extending slantwise from the main rod, an angle formed between the main rod and the elastic arm when the second switch is turned on being larger an angle formed between the main rod and the elastic arm when the second switch is turned off.

17. The electronic device as described in claim 12, wherein the side plate comprises a plurality of guiding members each defining a groove therein, the sliding member mounted on the side plate with two opposite sides thereof engaged in the grooves of the guiding members, the sliding member being moveable relative to the side plate along the guiding members between a first position that the sliding member is adjacent to the top plate and a second position that the sliding member is far away from the top plate.

18. The electronic device as described in claim 17, wherein the slide plate comprises a first hook between the guiding members, the sliding member defining an opening therein and comprising a second hook extending from a periphery side of the opening, the sliding member mounted to the side plate with the first hook extended through the opening and aligned with the second hook, an elastic member being connected between the first hook and the second hook.

19. The electronic device as described in claim 18, wherein a distance between the first hook and the second hook is gradually increased when sliding member moves from the first state to the second state.

20. The electronic device as described in claim 12, wherein the first switch is vertically moveable between the turned on state and the turned off state, and the second switch is horizontally moveable when the sliding member being moveable relative to the side plate between the first state and the second state.

* * * * *